US010388306B2

(12) United States Patent
Little et al.

(10) Patent No.: US 10,388,306 B2
(45) Date of Patent: Aug. 20, 2019

(54) AUDIO DIGITIZATION

(71) Applicant: Blackmagic Design Pty Ltd, Port Melbourne (AU)

(72) Inventors: James Kenneth Little, Brunswick West (AU); Lachlan James Karp, Strathmore (AU); Gavin Richard Lucas, Hertfordshire (GB); Stuart William Arundell Hunt, Hertfordshire (GB); Thomas Richard Clarke, Luton (GB); Clive Nicholas Gunn, Hertfordshire (GB); David Matthew Snape, Hertfordshire (GB)

(73) Assignee: Blackmagic Design Pty Ltd, Port Melbourne (AU)

( * ) Notice: Subject to any disclaimer, the term of this patent is extended or adjusted under 35 U.S.C. 154(b) by 0 days.

(21) Appl. No.: 15/940,131

(22) Filed: Mar. 29, 2018

(65) Prior Publication Data

US 2018/0294002 A1 Oct. 11, 2018

(30) Foreign Application Priority Data

Mar. 31, 2017 (AU) ................................ 2017901187

(51) Int. Cl.
*G11B 5/09* (2006.01)
*G11B 20/10* (2006.01)
*G11B 20/22* (2006.01)
*G11B 27/032* (2006.01)
*G11B 27/10* (2006.01)
*H04N 5/253* (2006.01)
*G11B 20/04* (2006.01)

(52) U.S. Cl.
CPC ................ *G11B 5/09* (2013.01); *G11B 20/04* (2013.01); *G11B 20/10037* (2013.01);
(Continued)

(58) Field of Classification Search
CPC ....... G11B 5/00; G11B 20/10009; G11B 27/36; G11B 5/09; G11B 20/10; G11B 20/10222
(Continued)

(56) References Cited

U.S. PATENT DOCUMENTS 4,286,294 A 8/1981 Nakauchi et al.
4,594,621 A * 6/1986 Noguchi ............. G11B 5/0086
360/70

(Continued)

OTHER PUBLICATIONS

Blake Jones: "Digital Conversion of Film" Sep. 2, 2016 (Sep. 2, 2016) XP055491378. Retrieved from the Internet: URL: http://www.archiware.com/blog/digital-conversion-film/ [retrieved on Jul. 10, 2018].

(Continued)

*Primary Examiner* — Nabil Z Hindi
(74) *Attorney, Agent, or Firm* — Seed Intellectual Property Law Group LLP

(57) ABSTRACT

A method of digitizing an audio track carried on an elongate recording medium, such as a movie film, includes transporting the recording medium containing the audio track past a reader to enable sequential reading of the audio track. The reading of the audio track generates an analog output signal. The method also includes sensing a rate of transportation of the recording medium, and sampling the analog output signal at a sampling rate determined on the basis of the sensed rate of transportation to digitize the analog output signal. A system for digitizing audio is also disclosed.

18 Claims, 3 Drawing Sheets

(52) U.S. Cl.
CPC .. *G11B 20/10222* (2013.01); *G11B 20/10527* (2013.01); *G11B 20/225* (2013.01); *G11B 27/032* (2013.01); *G11B 27/10* (2013.01); *H04N 5/253* (2013.01); *G11B 2220/913* (2013.01)

(58) Field of Classification Search
USPC .................................. 360/25, 32, 39, 51, 55
See application file for complete search history.

(56) References Cited

U.S. PATENT DOCUMENTS 6,483,789 B1 * 11/2002 Kubota .............. G11B 20/1883
360/51

7,974,035 B2 * 7/2011 Bliss ........................ G11B 5/09
360/32

OTHER PUBLICATIONS

Anonymous: "Blackmagic Design Announces New Audio and KeyKode Reader for Cintel Film Scanners" Jul. 20, 2017 (Jul. 20, 2017), XP055491196, Retrieved from the Internet: URL:https://www.blackmagicdesign.com/api/print/nl/media/print/release/20170720-02.pdf?filename=BlackmagicDesignPR-20170720-02.pdf [retrieved on Jul. 9, 2018].

Extended European Search Report for EP Application No. 18164719.9, dated Jul. 17, 2018, 8 pgs.

* cited by examiner

AUDIO DIGITIZATION

BACKGROUND

Technical Field

The present disclosure relates to systems and methods of audio digitization.

Description of the Related Art

Sound can be recorded in an audio cassette, tape, film, DAT (digital audio tape), CD, or other sound recording mediums. Depending on the actual sound recording process and the recording medium used, it can be stored either as an analog signal or a digital signal. In the past it was particularly common to record audio as a time sequential analog signal on a reel-to-reel tape, film, or other elongate recording medium. Such recordings were often termed "tracks". A recording medium may comprise multiple tracks to store different channels of audio recording.

It is possible to convert analog sound to digital sound, and vice versa. The process that converts analog sound information to digital sound information is generally referred to as audio digitization. Systems which perform audio digitization can be stand-alone systems, but it may also be incorporated into a multimedia processing system such as a telecine or film scanner. To convert a sound recording track that is recorded on an elongate recording medium, such as a film or a cassette tape, into a digital form, the audio digitization system generally needs to include a transport mechanism for transporting the elongate recording medium past a reader head continuously. Conversely (although uncommonly), the recording medium could be held stationary and the reader head moved, or the reader head and recording medium are both moved. The reader head reads the analog sound information stored on the recording medium and in turn generates an analog output representative of the analog sound. The analog output is then sampled at a predetermined sampling rate by an analog-to-digital converter before being stored again in digital form on a suitable recording medium.

In the scenario described above, as the recording medium needs to be physically transported past the reader head continuously, the stability and accuracy of the transport system plays an important role in determining the quality of the digitized information. The transport system needs to be mechanically stable and accurate to ensure the digitized sound information is not compromised due to variances in transport speed. Nonetheless, it is generally not possible to completely avoid imperfections in the digitized sound caused by irregular tape or film motion. For example, both 'wow' and 'flutter' are terms used to describe pitch variations in the analog reproduction of sound that can be captured in a digitized audio signal resulting from irregular film or tape movement.

There are a few existing solutions to improve the transport system of an audio digitization system to thereby minimize the sound imperfections caused by irregular tape or film movement. One solution involves placing the audio digitization system on a mechanically stable platform so that the transportation process can take place without any disturbances. Another solution involves using highly precise bearings and heavy flywheels to damp out any drive speed variations. While such transport systems can sometimes achieve a higher sound quality, they are also very heavy and expensive.

Accordingly, another solution involves subjecting the digitized sound recordings to a series of 'smoothing' steps in computer software to detect and remove abnormal pitch variations. One such software package is "Celemony". However, the software based solution may be considered expensive and introduces another step in the audio digitization workflow.

Accordingly, there is a need for an improved audio digitization system and method that addresses at least one of the drawbacks of the prior art, or at least an alternative choice for the general public.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

BRIEF SUMMARY

In broad concept, the present disclosure is based on a realization by the inventors that, when seeking to digitize an analog signal that is read from a recording medium using a method in which a reader that generates the analog signal is translated relative to a track encoding the analog audio, it is possible to correct for transportation speed variations by adjusting the digitization process to compensate for the variations. In particularly preferred embodiments, in the case that it is desired to sample the analog audio signal at a target sample rate, the actual sample rate can be varied from the target sample rate to compensate for transport speed variations. Preferably, the relative transportation speed (or variations in relative transportation speed) is determined at or near the reader so that it reflects variations experienced by the reader. In a preferred form, a positive variation (increase) in relative translation speed thus causes a corresponding increase in the actual sampling rate, whereas a negative variation (decrease) in relative translation speed causes a corresponding decrease in the actual sampling rate.

In a first aspect there is disclosed a method of digitizing an audio track carried on an elongate recording medium, the method including:
  transporting the recording medium containing the audio track past a reader to enable sequential reading of the audio track;
  reading the audio track with the reader to generate an analog output signal;
  sensing a rate of transportation of the recording medium; and
  sampling the analog output signal at a sampling rate determined on the basis of the sensed rate of transportation to digitize the analog output signal.

The sampling rate can be determined on the basis of a modulator clock signal having a modulator clock frequency.

In a second aspect there is disclosed a method of digitizing an audio track carried on an elongate recording medium, the method including:
  transporting the recording medium containing the audio track past a reader to enable sequential reading of the audio track;
  reading the audio track with the reader to generate an analog output signal;
  sensing the rate of transportation of the recording medium;
  generating a modulator clock signal having a modulator clock frequency based on the sensed rate of transportation; and applying the modulator clock signal to an analog-to-digital converter to digitize the analog output signal.

In embodiments of the aforementioned aspects, the step of sensing the rate of transportation of the recording medium can include determining the rotational frequency or rotational speed of at least one rotational component of the transport mechanism that carries the recording medium.

In one form, the step of sensing the rate of transportation of the recording medium can include any one or more of the following:

monitoring the rotation of at least one rotational component of the transport mechanism that carries the recording medium;

monitoring a rotating element rotationally coupled to at least one rotational component of the transport mechanism; and monitoring a linear motion of an element moved by at least one rotational component.

In one form, the step of sensing the rate of transportation of the recording medium can include receiving one or more output signals from an encoder rotationally coupled to the rotational component of the transport mechanism.

The method can include adjusting the modulator clock frequency based on an output signal received from the encoder configured to represent the rate of transportation of the recording medium.

In one form, the modulator clock frequency is determined based on an adjustment frequency and a base clock frequency.

In one form, the encoder generates 512 output signals per revolution of the rotational component of the transport mechanism.

In one form, the base clock frequency can be 12.288 MHz.

In one form, the target sampling rate can be at or about 48 kHz.

In one form, the encoder rotates in synchronization with the rotational component of the transport mechanism.

In one form, the rotational component of the transport mechanism can include any one or more of a roller, a gear, a sprocket, a capstan, a spindle, an axle, a spool, or the like.

Most preferably, the rotational component is a high precision roller which rotates in concert with the recording medium.

In one form, the step of reading the audio track can include one or more of:

receiving an optical signal representing an optically encoded audio track; or sensing a magnetically encoded audio track.

In one form, the method further includes:
forwarding the digitized analog output signal to a buffer memory,
monitoring a status of the buffer memory, and
adjusting the modulator clock frequency based on the status of the buffer memory.

In one form, the method further includes:
determining a reference frequency for the digitized analog output signal, based on one or more of the following:
a measured rotational frequency or speed of at least one rotational component of a transport mechanism that carries the recording medium; and
an input signal that drives a rotational motion of at least one rotational component of the transport mechanism.

Said reference frequency can correlate with a final output bit rate for the digitized output signal.

In one form, the method further includes:
accessing the digitized analog output signal stored in the buffer memory, and
generating a corrected digitized analog output signal based on the reference frequency and the digitized analog output signal stored in the buffer memory.

In a third aspect there is disclosed an audio digitization system including:
a reader configured to read audio information recorded on a recording medium and generate an analog output signal;
a transport mechanism configured to move the recording medium carrying the audio information to be digitized, past the reader; and
an analog to digital converter configured to sample the analog output signal of the reader at a sample rate, wherein said sample rate is dependent on a rate of transportation of the recording medium.

The transport mechanism preferably includes a sensing system arranged to sense the rate of transportation of the recording medium.

The sensing system can be configured to output a reference clock signal that may be used either directly as the clock signal, or by a clock signal generator to generate the clock signal for use by the analog to digital converter.

In a fourth aspect there is disclosed an audio digitization system including:
a reader configured to read audio information recorded on a recording medium and generate an analog output signal;
a transport mechanism configured to move the recording medium carrying the audio information to be digitized, past the reader;
a clock signal generator configured to generate a modulator clock signal; and
an analog to digital converter (ADC) configured to sample the analog output signal of the reader on the basis of modulator clock signal.

The transport system preferably includes a sensing system arranged to sense the rate of transportation of the recording medium.

In the above embodiments, the sensing system senses the rate of transportation of the recording medium at a location adjacent to the reader.

The transport sensing system can include an encoder rotationally coupled to a component of the transport mechanism which rotates in synchronization with the transport of the recording medium past the reader.

The encoder can be coupled to any one or more of a roller, a gear, a sprocket, a capstan, a spindle, an axle, a spool, or the like, or a rotating element rotationally coupled to any one of the above.

The reader can include any one or more of an optical reader configured to read an optically encoded audio track, or a magnetic reader configured to read a magnetically encoded audio track.

The audio digitization system can form part of a telecine, a motion picture film scanner, a video digitizer, or the like.

As used herein, except where the context requires otherwise, the term "comprise" and variations of the term, such as "comprising", "comprises" and "comprised", are not intended to exclude further additives, components, integers or steps.

Further aspects of the present disclosure and further embodiments of the aspects described in the preceding paragraphs will become apparent from the following description, given by way of example and with reference to the accompanying drawings.

DETAILED DESCRIPTION

Figure 1:
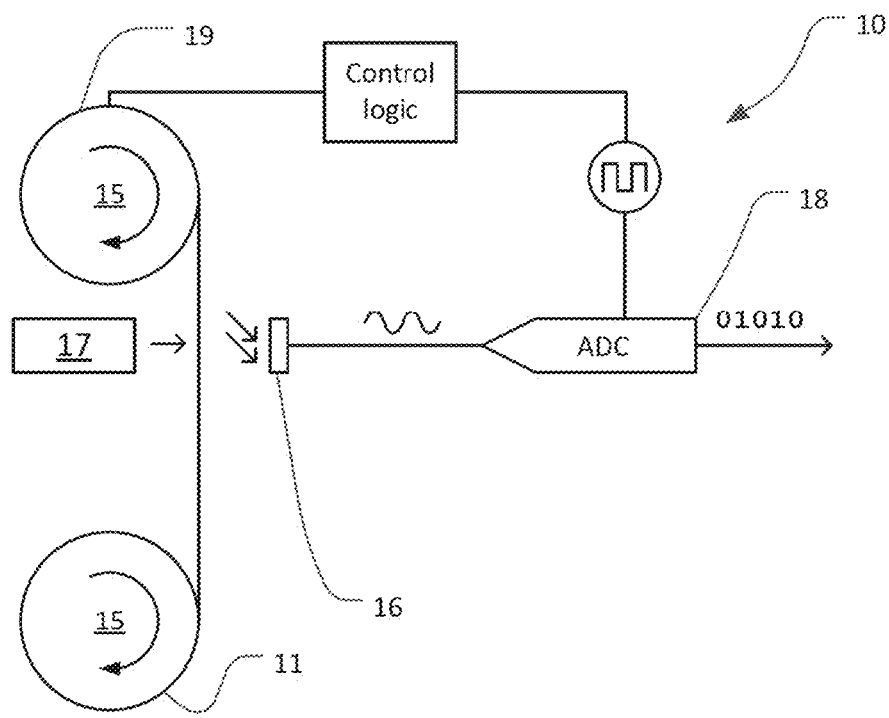
FIG. 1 is a schematic diagram of an audio digitization system according to one embodiment.
Figure 2:
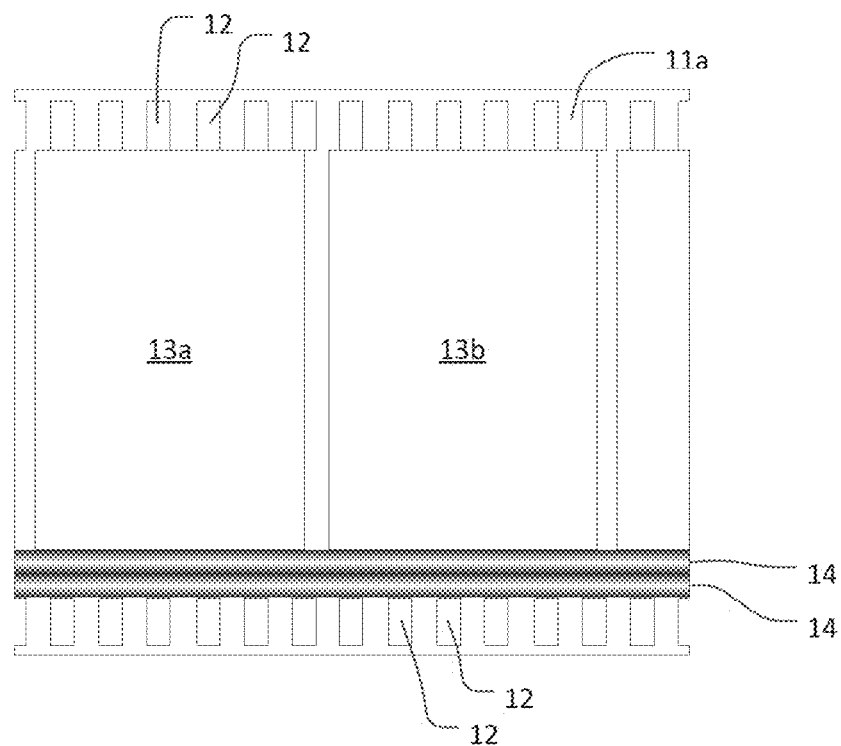
FIG. 2 is a diagram of a motion picture film illustrating the location of an analog audio track in one embodiment.

An exemplary audio digitization system embodying aspects of the invention is shown in FIG. 1. The digitization system 10 is operative to scan a continuously moving elongate recording medium 11 and to digitize the analog sound information recorded on the recording medium 11. FIG. 2 shows an example of a recording medium 11 that may be used in conjunction with the system of FIG. 1. In this example, it is a film 11a. While a preferred embodiment will be described in the context of motion picture film digitization and thus the recording medium 11 is motion picture film having sound recorded as one or more tracks on the film 11a, one would understand that other embodiments of the present invention may be adapted for use with other forms of analog encoded recording medium that requires a transport mechanism, such as reel-to-reel magnetic tape, phonograph cylinders, gramophone records, or the like.

The film 11a includes one or more analog sound tracks 14 along one or both edges to provide monaural or binaural audio information for the sequence of film frames 13a, 13b. These sound tracks 14 can be of magnetic or photographic form, depending on the recording technology that was used to record the sound. A synchronization track 12, or also known as reference track may also be provided which generally includes a plurality of apertures. Each aperture or a group of apertures may be associated with a respective frame 13a, 13b. The reference track 12 is generally provided for the purposes of transporting and stabilizing the film 11a during film movement. It may also be used as a standard measuring reference with certain camera systems to refer to the size of the frame.

Now with reference to FIG. 1 again, the recording medium 11 is carried by a transport system 15 to move the recording medium 11 at a substantially constant speed past a reader head 16 to read the analog sound information stored. In the embodiment shown, the reader head 16 has an associated scanning position, where the recording medium 11 is scanned as it is transported past the reader head 16. In this example, the reader head 16 is an optical reader. On one side of the recording medium 11, there is positioned a light source 17 illuminating the recording medium's 11 optical sound track. On the opposite side of the recording medium 11, a reader head 16 is disposed to receive the light transmitted through the recording medium 11 and to produce analog output signals representative of the light transmitted through the recording medium 11. The analog output signals are then transmitted to an analog to digital converter (ADC) 18 to be converted into a digital form. Although FIG. 1 shows a system where sound tracks are optically stored and read, one should understand that aspects of the invention can be readily adapted to be used in other systems where sound tracks may be recorded magnetically and the reader head may be of a magnetic type. In some embodiments, the recording medium 11 can include audio tracks encoded in multiple forms, e.g., optical and magnetic, and the system can include reader heads corresponding to each.

In accordance with the present disclosure, the analog to digital converter 18 is configured such that it samples the analog output of the reader head 16 at a sampling rate determined on the basis of the sensed rate of transport of the recording medium 11. This sampling rate differs from the target sampling rate of the digitization by a small fraction and increases or decreases to compensate for variations in the transportation speed of the recording medium 11 relative to the reader head 16.

The rate of transport of the recording medium 11 may be determined in various ways. In one embodiment, the rate of transportation of the recording medium 11 may be determined based on the rotational frequency or speed of at least one rotational component 19 of the transport mechanism 15 that carries the recording medium 11. More specifically, the system 10 may monitor the rotation of a rotational component 19 of the transport mechanism 15 that carries the recording medium 11, or monitor a rotating element (not shown) that is rotationally coupled to the rotational component 19 of the transport mechanism 15. In some cases, the system can monitor the linear motion of an element (not shown) that is moved by a rotational component of the transport system. In a particularly preferred embodiment, rotational component 19 is a precision roller over which the recording medium 11 passes. Such a roller can be machined and mounted on bearings which ensure that the roller is precisely circular (or as precise as machining tolerances practically permit) and is mounted on bearings in such a manner as to run as precisely concentrically as possible. Furthermore, multiple reader heads mounted on diametrically opposing sides of the roller 19 and can be provided to remove the effect of any lack of rotational concentricity in the roller 19.

Figure 3:
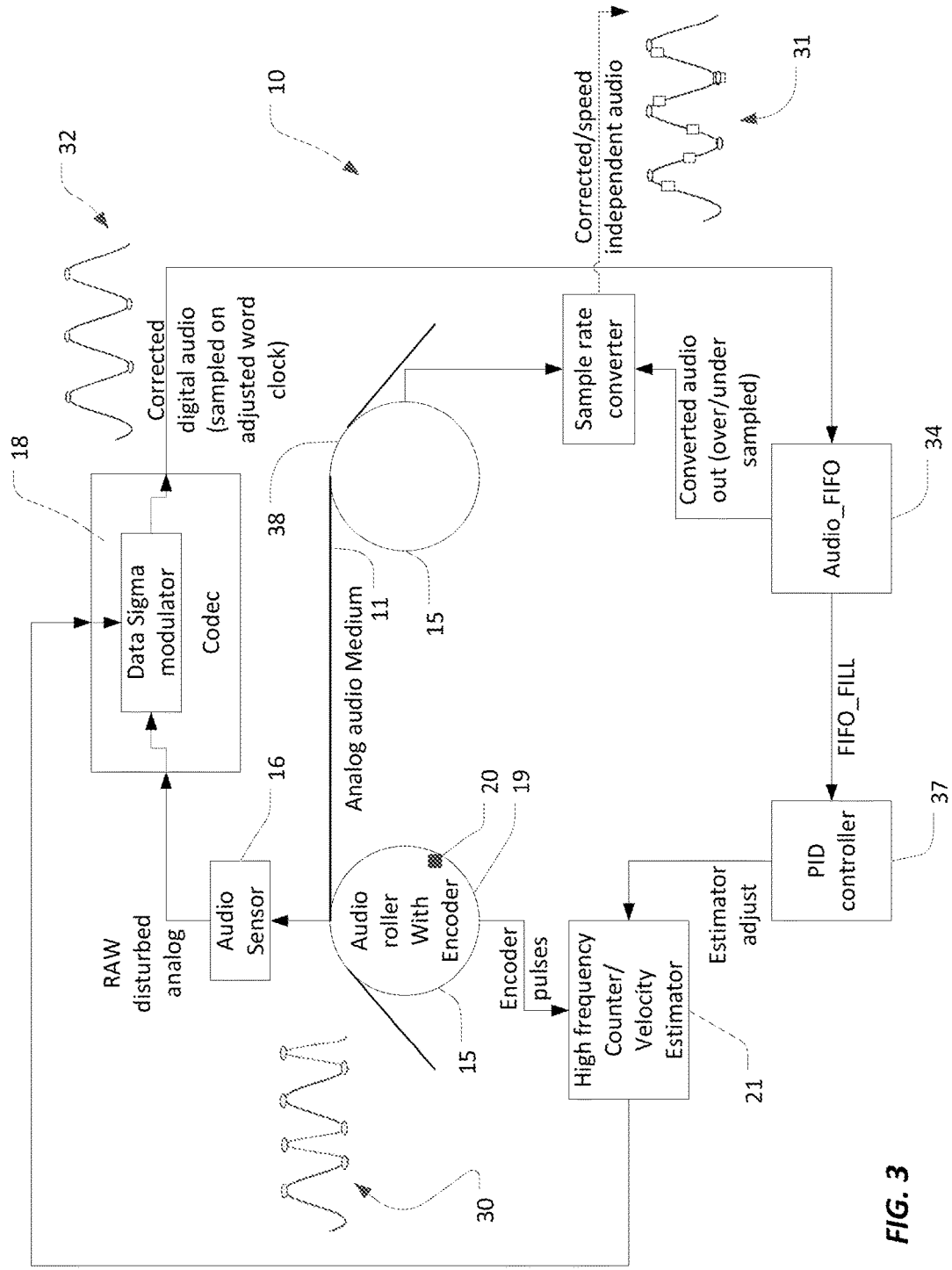
FIG. 3 is a schematic diagram showing additional details of an audio digitization system of the type illustrated in FIG. 1.

FIG. 3 shows more details of the embodiment of FIG. 1. In this embodiment, the transport mechanism 15 includes an encoder 20 rotationally coupled to the roller 19 of the transport mechanism 15. The encoder 20 is configured to generate output signals indicating the rotational position of the encoder 20. For example, the encoder 20 may be configured to generate any suitable number of pulses for each complete revolution of the roller 19. In one form, 512 pulses can be generated, but in other embodiments a higher number, say 1000, may be generated. The output signals of the encoder 20 are received and analyzed by a velocity estimator 21. The velocity estimator 21 has a high frequency clock (e.g., on the order of 150 MHz) and records the number of counts between pulses received from the encoder 20. From this, it calculates fluctuations in the rotational speed of the roller 19 during transport. If it is determined that there is speed variation (from the expected speed), the velocity estimator 21 generates a frequency adjustment signal which is then used in conjunction with a base clock frequency to generate a modulator clock signal for the ADC converter 18.

As will be appreciated by one of ordinary skill in the art, the sample rate used for digitizing an analog audio signal will typically be around 50 kHz in order to capture the sounds in frequency band having a bandwidth approximately equal to that of human hearing. In the present example, the ADC 18 has a target sample rate of 48 kHz. In this example, the ADC 18 employs a Delta Sigma modulator. As will be appreciated by those skilled in the art, the Delta Sigma modulator has a single bit ADC and this oversamples the analog signal using at a frequency that is much higher than the target sampling rate, e.g., 48 kHz. The oversampling is used by the Delta Sigma modulator to provide the bit depth required for the digitizing the signal. The output signals from the delta sigma ADC may, in some embodiments, be averaged (using the sample rate converter, as described below) and combined to generate a signal equivalent to a conventional ADC sampling at the target frequency, e.g., 48 kHz.

The ADC 18 is supplied with a modulator clock signal that governs when the ADC takes each successive sample. In this example, the modulator clock frequency is centered at 12.288 MHz, but may vary depending on the required sampling frequency of the output sound signal and in order to maintain the desired sampling frequency at various transport speeds/disturbances. In the present example, the Delta Sigma ADC operates in a manner equivalent to a conventional 48 kHz ADC with a bit depth of 8-bit. In other embodiments, a higher or lower bit depth or sample rate can be used, e.g., having a 24 bit 96 kHz output. According to the preferred embodiment of the disclosure, the modulator clock frequency is adjusted (up or down relative to the central frequency) based on the output of the velocity estimator 21 to compensate for sensed speed variations that occurred during transport of the recording medium 11. The variation is preferably in the range of 2.048 MHz to 15.36 MHz, but higher or lower rates may be used. In the case that the instantaneous transportation speed of the recording medium 11 is slower than desired, the rotational frequency of the roller 19 will be reduced. This is then sensed by the encoder 20, and the velocity estimator 21 will adjust down the frequency of the modulator clock signal. This then increases the time between samples taken by the ADC 18. Conversely, if the transport speed fluctuates above its predetermined speed, the modulator clock frequency will be increased and the actual sample rate attained by the ADC 18 increased accordingly, e.g., between 8 kHz and 60 kHz according to the preferred modulator clock frequency variation noted above.

Conceptually, consider the simplistic case of a sinusoidal audio wave which should be played back as a constant frequency tone. To sample this tone, it is sufficient to take a sample at each peak and trough of the analog signal, as indicated by ovals marked on waveform 30. Due to transportation speed fluctuations during playback, the analog audio signal read output by the audio reader 16 will not be a perfect sinusoid, but will have portions in which the waveform is compressed in time and portions where it is stretched in time. When a constant sample rate is used (in an attempt to sample the idealized position of the peak and trough of the waveform), the peaks and troughs are missed. However, using an embodiment of the present disclosure, the sampling rate used for digitization of the analog signal is adjusted, e.g., by adjusting the clock signal governing the sampling rate, to match the time-domain disturbances in the waveform. By doing this, the sample that is intended to be taken at the waveform peak more accurately coincides with the peak, and the sample intended to be taken at the waveform trough more accurately coincides with the trough, as indicated by ovals marked on waveform 32. Although the bit stream of the ADC is derived at a variable sample rate, it is output from the ADC at a fixed target bit rate—which in the above example is 48 kHz.

The ADC's output bit stream 32 is passed to the audio buffer 34 at its predetermined bit rate. However, it may be necessary to adjust the output bit stream to coincide with that required downstream. This is achieved by using a sample rate converter 36. The sample rate converter receives a reference frequency, e.g., from a component of the transport system, such as roller 38. The reference frequency represents the transport rate of the recording medium 11 relative to the requirement of the output signal. For example, if the digitized output signal represents audio for a 24 frames per second (fps) film, but the actual transport rate for film being digitized is only 12 fps, then twice as many samples will have been accumulated by the buffer memory 34 than are needed to generate the output audio signal. The sample rate converter 36 corrects the output signal for this mismatch.

In another example, if the digitized output signal represents audio for a 24 frames per second (fps) film, but the actual transport rate for film being digitized was 30 fps, then too few samples will have been accumulated by the buffer memory 34 than are needed to generate the output audio signal. This case is illustrated in wave form 31, in which the sample points marked by ovals are directly produced by the ADC 18. However, this represents an undersampling of the analog signal (essentially because too many frames were digitized each second). In this case, the sample rate converter 36 outputs a data stream comprising 6 data point marked by squares instead, of the 5 sample values marked by ovals. The mechanism for performing sample rate conversion can be any suitable technique known to those skilled in the art.

A second feedback mechanism can also be applied to control the accumulation of digitized audio in the buffer memory 34. As will be appreciated, the buffer memory 34 must contain sufficient data to feed the sample rate converter, but not overflow. This is controlled by monitoring the buffer usage and generating, using a PID controller 37, a control signal that adjusts the output of the velocity estimator 21 up and down accordingly. The level of adjustment performed by the PID controller 37 will typically be very low frequency (e.g., below audible frequency) and hence will not affect output audio quality.

Figure 4:
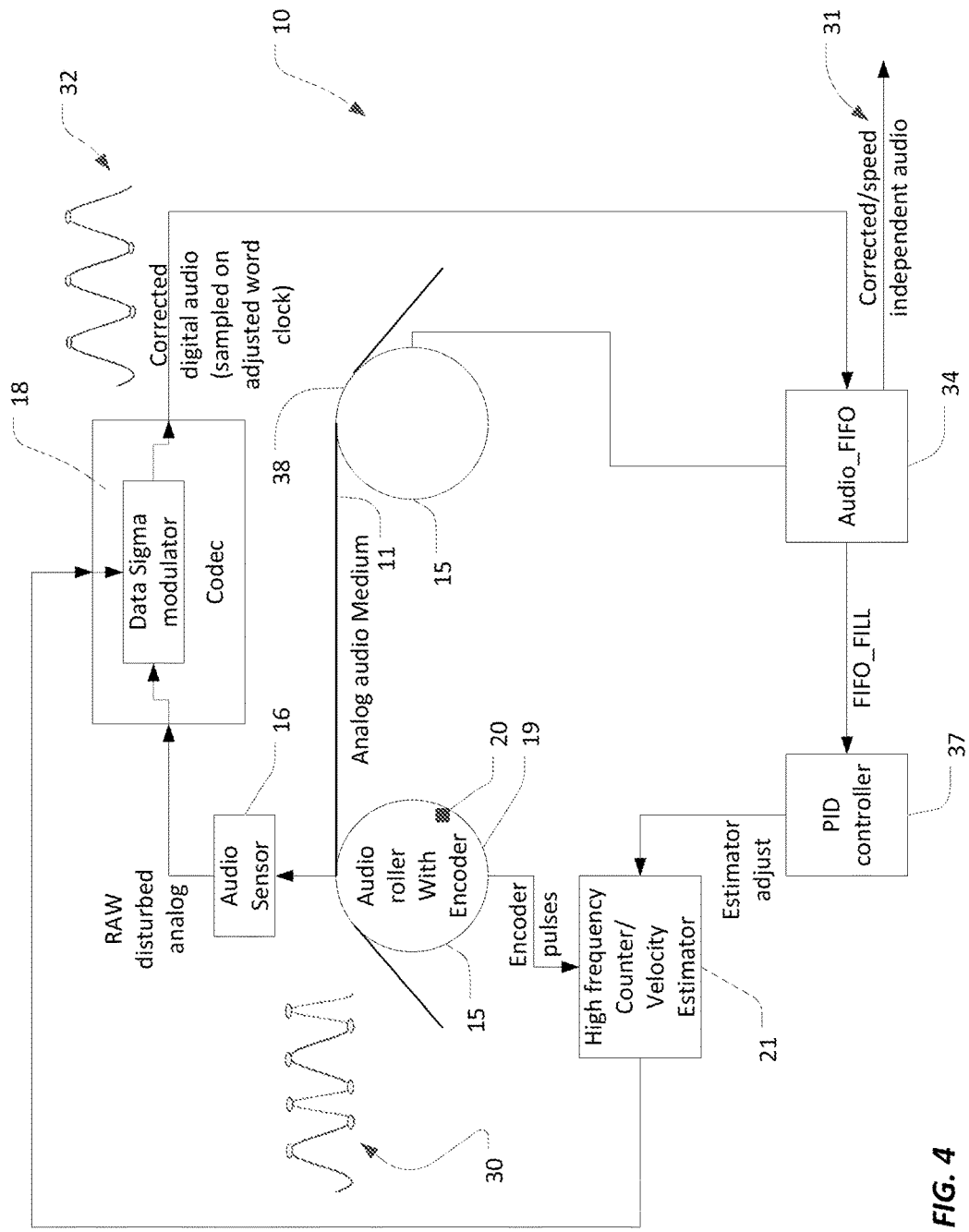
FIG. 4 is a schematic diagram showing additional details of another embodiment of an audio digitization system of the type illustrated in FIG. 1.

FIG. 4 shows a second embodiment of a system of the type shown in FIG. 1. Common features have been given matching reference numerals and will not be described in detail again. The system of the present embodiment differs from that of FIG. 3 in that the present embodiment does not include a sample rate converter 36. This is achieved because the modulator clock signal for the ADC converter 18 is allowed to vary over a wider frequency range than in the previous example.

By permitting a wider frequency variation by the ADC 18, it is possible for the ADC 18 to handle greater frequency variations, both in terms of the extent of wow and flutter being corrected for, and also in terms of the range of target sampling rate, e.g., between 8 kHz and 60 kHz, although higher or lower sampling rates may be used.

Again the transport mechanism 15 includes an encoder 20 rotationally coupled to the roller 19 of the transport mechanism 15. The encoder 20 is configured to generate output signals indicating the rotational position of the encoder 20. The output signals of the encoder 20 are received and analyzed by a velocity estimator 21. The velocity estimator 21 records the number of counts between pulses received from the encoder 20. As in the previous embodiments, any suitable number of encoder pulses can be used, but about 1000 per rotation is believed to be suitable. From this, it calculates fluctuations in the rotational speed of the roller 19 during transport. If it is determined that there is speed variation (from the expected speed), the velocity estimator 21 generates a frequency adjustment signal which is then used in conjunction with a base clock frequency to generate a modulator clock signal for the ADC converter 18. The modulator clock signal governs when the ADC takes each successive sample. The modulator clock frequency is adjusted (up or down relative to the central frequency) based on the output of the velocity estimator 21 to compensate for sensed speed variations that occurred during transport of the recording medium 11. The ADC's output bit stream 32 is passed to the audio buffer 34 at its predetermined bit rate. In this example, digitized output signal may be read directly from the buffer memory 34 without resampling. As should be appreciated, the present embodiment can work over the same target sampling rates (e.g., 8 kHz to 60 kHz, or up to 96 kHz or higher) and bit depths (e.g., 8 bit to 24 bit or other bit depth as needed) as the embodiment of FIG. 3.

A second feedback mechanism can also be applied to control the accumulation of digitized audio in the buffer memory 34. As will be appreciated, the buffer memory 34 must contain sufficient data to output data at the correct sample rate but not overflow. This is controlled by monitoring the buffer usage and generating, using a PID controller 37, a control signal that adjusts the output of the velocity estimator 21 up and down accordingly. The level of adjustment performed by the PID controller 37 will typically be very low frequency (e.g., below audible frequency) and hence will not affect output audio quality.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of digitizing an audio track carried on an elongate recording medium comprising a film containing a sequence of frames captured at a frame rate, the method including:
   transporting the recording medium containing the audio track past a reader to enable sequential reading of the audio track during a process for digitizing frames contained on the film;
   reading the audio track with the reader to generate an analog output signal;
   sensing a rate of transportation of the recording medium; and
   sampling the analog output signal at a sampling rate determined on the basis of the sensed rate of transportation to digitize the analog output signal, wherein sampling the analog output signal includes:
   generating a modulator clock signal having a modulator clock frequency based on the sensed rate of transportation; and
   applying the modulator clock signal to an analog-to-digital converter to digitize the analog output signal and generate a digitized audio output corresponding to the frame rate of the film.

2. The method according to claim 1, wherein the method further includes adjusting the modulator clock frequency based on an output signal received from an encoder configured to represent the rate of transportation of the recording medium.

3. The method according to claim 1, wherein the modulator clock frequency is determined based on an adjustment frequency and a base clock frequency.

4. The method according to claim 1, wherein sensing the rate of transportation of the recording medium includes:
   determining a rotational frequency or rotational speed of at least one rotational component of a transport mechanism that carries the recording medium.

5. The method according to claim 1, wherein sensing the rate of transportation of the recording medium includes any one or more of the following:
   monitoring a rotation of at least one rotational component of a transport mechanism that carries the recording medium;
   monitoring a rotating element rotationally coupled to at least one rotational component of the transport mechanism,
   monitoring a linear motion of an element moved by at least one rotational component; and
   receiving one or more output signals from an encoder rotationally coupled to a rotational component of the transport mechanism.

6. The method according to claim 5, wherein the encoder rotates in synchronization with the rotational component of the transport mechanism.

7. The method according to claim 5, wherein the rotational component of the transport mechanism includes any one or more of a roller, a gear, a sprocket, a capstan, a spindle, an axle, or a spool.

8. The method according to claim 1, wherein reading the audio track includes one or more of:
   receiving an optical signal representing an optically encoded audio track; or
   sensing a magnetically encoded audio track.

9. The method according to claim 1, further including:
   forwarding the digitized analog output signal to a buffer memory,
   monitoring a status of the buffer memory, and
   adjusting the modulator clock frequency based on the status of the buffer memory.

10. The method according to claim 1, further including:
    determining a reference frequency for the digitized analog output signal, based on one or more of the following:
    a measured rotational frequency or speed of at least one rotational component of a transport mechanism that carries the recording medium; and
    an input signal that drives a rotational motion of at least one rotational component of the transport mechanism.

11. An audio digitization system, including:
    a reader configured to read audio information recorded on a film being digitized and generate an analog output signal, said film containing a sequence of frames captured at a frame rate;
    a transport mechanism configured to move the film carrying the audio information to be digitized, past the reader; and
    an analog-to-digital converter configured to sample the analog output signal of the reader at a sample rate, wherein said sample rate is dependent on a rate of transportation of the film; and
    a clock signal generator configured to generate a modulator clock signal, wherein the analog-to-digital converter is configured to sample the analog output signal of the reader on the basis of modulator clock signal to generate an output signal corresponding to the frame rate of the film.

12. The audio digitization system according to claim 11, further including a sensing system arranged to sense the rate of transportation of the film.

13. The audio digitization system according to claim 12, wherein the sensing system senses the rate of transportation of the film at a location adjacent to the reader.

14. The audio digitization system according to claim 12, wherein the sensing system is configured to output a reference clock signal that is as one or more of:
   directly as the clock signal, and
   by a clock signal generator to generate the clock signal for use by the analog to digital converter.

15. The audio digitization system according to claim 11, wherein the sensing system can include any one or more of the following:
   an encoder rotationally coupled to a component of the transport mechanism which rotates in synchronization with the transport of the film past the reader, wherein said encoder is optionally coupled to any one or more of a roller, gear, sprocket, capstan, spindle, axle, spool, or the like; a rotating element rotationally coupled to any one of the above.

16. The audio digitization system according to claim 11, wherein the audio digitization system is configured to:
   transport the film containing the audio track past a reader to enable sequential reading of the audio track;
   read the audio track with the reader to generate the analog output signal;
   sense a rate of transportation of the film; and
   sample the analog output signal at a sampling rate determined on the basis of the sensed rate of transportation to digitize the analog output signal.

17. The audio digitization system according to claim 11, wherein the reader includes any one or more of:
   an optical reader configured to read an optically encoded audio track; and
   a magnetic reader configured to read a magnetically encoded audio track.

18. A system including an audio digitization system as claimed in claim 16, wherein the system comprises one or more of:
   a telecine, a motion picture film scanner, and a video digitizer.

* * * * *